(12) United States Patent
Bennett et al.

(10) Patent No.: US 7,006,320 B1
(45) Date of Patent: Feb. 28, 2006

(54) DISK DRIVE COMPRISING A MULTI-PHASE SPINDLE MOTOR HAVING A CENTER TAP CONNECTABLE TO A SECONDARY SUPPLY VOLTAGE

(75) Inventors: George J. Bennett, Murrieta, CA (US); Charles R. Patton, III, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/210,396

(22) Filed: Jul. 31, 2002

(51) Int. Cl.
*G11B 15/46* (2006.01)

(52) U.S. Cl. .................... 360/73.03; 360/75; 360/70

(58) Field of Classification Search ............ 360/69–71, 360/73.01–73.03, 75; 318/459–500, 376–377, 318/254, 560; 310/67 R, 189; 388/928.1
See application file for complete search history.

(56) References Cited

U.S. PATENT DOCUMENTS

| | | | |
|---|---|---|---|
| 4,589,036 A | * | 5/1986 | Bertschy et al. .............. 360/75 |
| 5,161,073 A | | 11/1992 | Gami et al. |
| 5,204,593 A | * | 4/1993 | Ueki ........................... 318/254 |
| 5,210,474 A | * | 5/1993 | Oswald ....................... 318/254 |
| 5,246,479 A | | 9/1993 | Gami et al. |
| 5,381,279 A | | 1/1995 | Dunn |
| 5,471,353 A | | 11/1995 | Codilian et al. |
| 5,532,563 A | | 7/1996 | Kodama et al. |
| 5,737,144 A | | 4/1998 | Ataee et al. |
| 5,808,440 A | | 9/1998 | Bennett et al. |
| 5,866,998 A | * | 2/1999 | Menegoli ..................... 318/254 |
| 6,013,990 A | | 1/2000 | Lee |
| 6,566,832 B1 | * | 5/2003 | Ataee ........................... 318/560 |

* cited by examiner

*Primary Examiner*—Sinh Tran
*Assistant Examiner*—Jason Olson
(74) *Attorney, Agent, or Firm*—Milad G. Shara, Esq.; Howard H. Sheerin, Esq.

(57) ABSTRACT

A disk drive is disclosed comprising an interface for receiving a primary supply voltage and a secondary supply voltage from a host computer. The primary supply voltage is applied to the windings of a multi-phase spindle motor in a commutation sequence, and the secondary supply voltage is connectable to a center tap of the windings.

26 Claims, 8 Drawing Sheets

| | $\phi_A$ | $\phi_B$ | $\phi_C$ |
|---|---|---|---|
| t0 – t0.5 – t1 | H | L | X |
| t1 – t1.5 – t2 | H | X | L |
| t2 – t2.5 – t3 | X | H | L |
| t3 – t3.5 – t4 | L | H | X |
| t4 – t4.5 – t5 | L | X | H |
| t5 – t5.5 – t6 | X | L | H |

FIG. 5B

| | $\phi_A$ | $\phi_B$ | $\phi_C$ |
|---|---|---|---|
| t0 – t0.5 | H | L | X |
| – t1 – t1.5 | H | | L |
| – t2 | | X | |
| – t2.5 – t3 | X | H | L |
| – t3.5 | L | H | |
| – t4 | | | X |
| – t4.5 – t5 | L | X | H |
| – t5.5 | | L | H |
| – t6 | X | | |

DISK DRIVE COMPRISING A MULTI-PHASE SPINDLE MOTOR HAVING A CENTER TAP CONNECTABLE TO A SECONDARY SUPPLY VOLTAGE

CROSS REFERENCE TO RELATED APPLICATIONS AND PATENTS

This application is related to co-pending U.S. patent application Ser. No. 09/552,400 entitled "DISK DRIVE COMPRISING SPIN DOWN CIRCUITRY HAVING A POWER CLAMP CIRCUIT FOR ENHANCING POWER AND BRAKING CONTROL" filed on Apr. 19, 2000, and to co-pending U.S. patent application Ser. No. 10/209,734 entitled "DISK DRIVE COMPRISING CONTROL CIRCUITRY POWERED BY A SECONDARY VOLTAGE SUPPLIED BY A CENTER TAP OF A SPINDLE MOTOR DURING A NORMAL OPERATING MODE" filed on Jul. 31, 2002, the disclosures of which are incorporated herein by reference.

BACKGROUND OF THE INVENTION

1. Field of the Invention

The present invention relates to spindle motors for disk drives. More particularly, the present invention relates to a disk drive comprising a multi-phase spindle motor having a center tap connectable to a secondary supply voltage.

2. Description of the Prior Art

Disk drives typically employ a multi-phase spindle motor (e.g., a three phase spindle motor) for spinning a disk while a head writes data to and reads data from the disk. The head is connected to a distal end of an actuator arm which is rotated about a pivot by a voice coil motor (VCM) in order to actuate the head radially over the disk to access radially spaced, concentric tracks. The disk drive receives power from a host computer, including a 12V supply for powering the spindle motor and VCM, and a 5V supply for powering the integrated circuits that control the operation of the disk drive. The amount of current the disk drive can draw from either supply is limited so as not to interfere with the proper operation of the host computer.

Two important performance metrics for a disk drive are the amount of time required for the spindle motor to spin up the disk to its operating RPM, and the seek time required for the VCM to position the head over a target track. A short spin up period is desirable not only to enhance the user's experience, but also to satisfy the time-out restriction imposed by the host computer. That is, the host computer will assume an error occurred if the disk drive does not return with a "ready" status within a prescribed time interval during a power on cycle. A short seek time is also desirable since the mechanical latency of the VCM dominates the overall access time. Both the spin up and seek times are limited by the amount of current that can be drawn from the 12V supply as well as the efficiency (cost) of the spindle motor and VCM. In addition, the inertia of the disk as determined from its physical characteristics as well as the operating RPM limit the spin up time. The spin up time increases as the form factor and operating RPM increase.

For higher RPM (e.g., 10,000 RPM) prior art disk drives typically employ a smaller form factor disk (e.g., 3 inch rather than 3.5 inch diameter disk) to achieve performance with respect to the spindle motor without exceeding the current limitations of the 12V supply. However, a smaller form factor requires more disks to achieve higher capacity which increases the cost and height of the disk drive.

U.S. Pat. No. 5,532,563 discloses a disk drive having an auxiliary power source used to augment the 12V supply to decrease the spin up time. However, the auxiliary power source increases the complexity and expense of the disk drive, and the auxiliary power source is recharged from the 12V supply which means during a power on sequence there is a charging delay before the spindle motor can begin the spin up process.

U.S. Pat. No. 5,381,279 discloses a disk drive wherein the current applied to the spindle motor is reduced during the acceleration and deceleration intervals of a seek with a corresponding increase in current to the VCM. During a coast period of the seek (between the acceleration and deceleration intervals) the current applied to the spindle motor is increased with a corresponding decrease in the current applied to the VCM. This enables more aggressive seek profiles while maintaining the spindle speed at its operating RPM without exceeding the current limit of the 12V supply. Although this technique reduces the seek and access times, it does not improve performance with respect to the spin up time. Further, abruptly changing the current supplied to the spindle motor creates undesirable acoustic vibrations audible to the end user.

There is, therefore, a need to cost effectively decrease the spin up and seek times in a disk drive without exceeding the current limitations of the host computer.

SUMMARY OF THE INVENTION

The present invention may be regarded as a disk drive comprising a disk having a plurality of tracks, a head, a voice coil motor for actuating the head radially over the disk, and an interface for receiving a primary supply voltage and a secondary supply voltage from a host computer. The disk drive further comprises a multi-phase spindle motor for rotating the disk, the multi-phase spindle motor comprising a plurality of windings, each winding comprising a first end and a second end, the second ends connected together at a center tap. A spindle driver, responsive to the primary supply voltage, commutates the windings over commutation intervals. The center tap of the windings is connectable to the secondary supply voltage.

In one embodiment, the primary supply voltage comprises twelve volts and the secondary supply voltage comprises five volts.

In one embodiment, the windings are wound to control the amount of current passing through the windings from the secondary supply voltage and the secondary supply voltage is connected directly to the center tap of the windings. In another embodiment, a switch connects the secondary supply voltage to the center tap, wherein the switch is modulated to control the amount of current passing through the windings from the secondary supply voltage. In yet another embodiment, a current sensor senses a magnitude of the current passing through the windings, wherein the secondary supply voltage is disconnected from the center tap if the magnitude of the current is greater than a threshold.

In still another embodiment, the spindle driver connects the first end of a first one of the windings and the first end of a second one of the windings to ground for at least part of a commutation interval in order to control the amount of current passing through the windings from the secondary supply voltage. In one embodiment, the interval that the first end of the second one of the windings is connected to ground varies in order to control the amount of current passing through the windings from the secondary supply voltage. In another embodiment, the spindle driver is responsive to a modulation signal for modulating the connection of the first end of the second one of the windings to ground for at least part of the commutation interval in order to control the amount of current passing through the windings from the secondary supply voltage.

In yet another embodiment, when the voice coil motor is accelerating the head during a seek operation the spindle motor draws less current from the primary supply voltage and more current from the secondary supply voltage. This allows the voice coil motor to draw more current from the primary supply voltage to facilitate faster seeks.

In one embodiment, the secondary supply voltage draws current from the primary supply voltage to implement a power converter.

The present invention may also be regarded as a method of operating a disk drive, the disk drive comprising a disk having a plurality of tracks, a head, a voice coil motor for actuating the head radially over the disk, an interface for receiving a primary supply voltage and a secondary supply voltage from a host computer, and a multi-phase spindle motor for rotating the disk, the multi-phase spindle motor comprising a plurality of windings, each winding comprising a first end and a second end, the second ends connected together at a center tap. The secondary supply voltage is connected to the center tap of the windings, and the windings are commutated over commutation intervals in response to the primary supply voltage.

DESCRIPTION OF THE PREFERRED EMBODIMENTS

Figure 1:
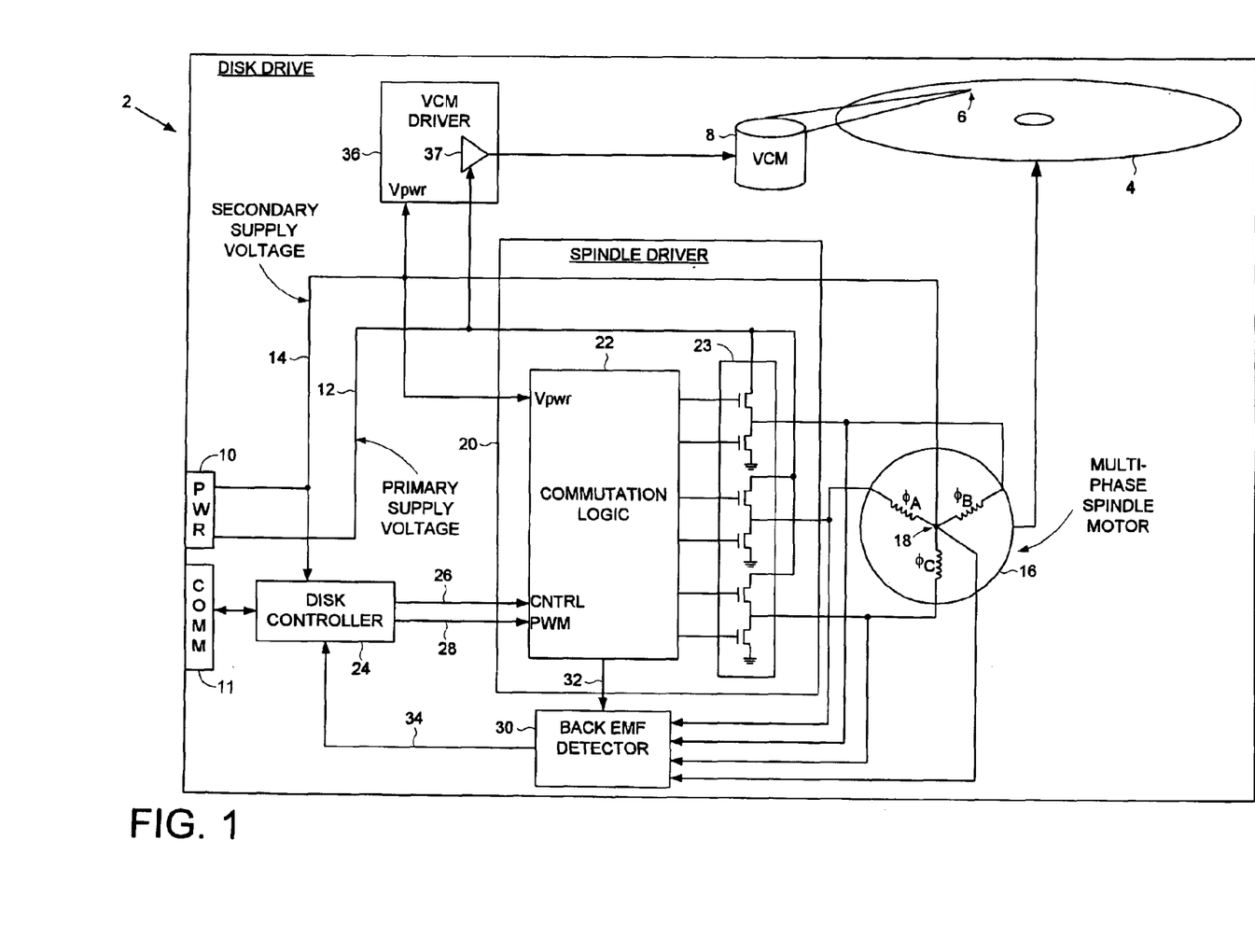
FIG. 1 shows a disk drive according to an embodiment of the present invention receiving a primary supply voltage from a host for driving the windings of a spindle motor and a secondary supply voltage connected to a center tap of the windings.

FIG. 1 shows a disk drive 2 according to an embodiment of the present invention comprising a disk 4 having a plurality of tracks, a head 6, a voice coil motor 8 for actuating the head 6 radially over the disk 4, and an interface 10 for receiving a primary supply voltage 12 and a secondary supply voltage 14 from a host computer. The disk drive 2 further comprises a multi-phase spindle motor 16 for rotating the disk 4, the multi-phase spindle motor 16 comprising a plurality of windings (e.g., $\phi A$, $\phi B$, $\phi C$), each winding comprising a first end and a second end, the second ends connected together at a center tap 18. A spindle driver 20, responsive to the primary supply voltage 12, commutates the windings over commutation intervals. The center tap 18 of the windings is connectable to the secondary supply voltage 14.

In the embodiment of FIG. 1, the spindle motor 16 comprises three windings ($\phi A$, $\phi B$, $\phi C$) corresponding to three phases. However, any suitable number of windings may be employed to implement any suitable multi-phase spindle motor. Further, any suitable commutation sequence may be employed to commutate the windings. In the embodiment of FIG. 1, the spindle driver 20 comprises commutation logic 22 for controlling switches 23 to commutate the windings of the spindle motor 16 in a two-phase, three-phase, or hybrid two-phase/three-phase mode as described below with reference to FIGS. 5A–5B.

A disk controller 24 communicates with the host computer over interface 11 and executes various operations (e.g., servo control, read/write channel, etc.) to perform read and write commands. The disk controller 24 generates a control signal 26 and a pulse width modulated (PWM) signal 28 applied to the spindle driver 22. The control signal 26 comprises control information (such as a starting state and a commutation clock), and the PWM signal 28 is used to modulate the driving current in the windings. The windings are connected to a back EMF detector 30 which detects threshold crossings (e.g., zero crossings) in the back EMF voltage generated by the windings with respect to the center tap 18. Since the back EMF voltage is distorted when current is flowing, the spindle driver 20 supplies a control signal 32 to the back EMF detector 30 identifying the "open" winding generating a valid back EMF signal. At each back EMF threshold crossing the back EMF detector 30 toggles a signal to generate a square wave signal 34. The frequency of the back EMF threshold crossings and thus the frequency of the square wave signal 34 represent the speed of the spindle motor 16. The disk controller 24 evaluates the square wave signal 34 and adjusts the PWM signal 28 in order to control the speed of the spindle motor 16. In an alternative embodiment, the spindle driver 20 comprises suitable circuitry for generating the PWM signal internally in response to a speed error signal generated by the disk controller 24. The spindle driver 20 may sense the current flowing through the windings of the spindle motor 16 and use current feedback to generate the PWM signal.

The disk controller 24 may be implemented as a single integrated circuit or multiple integrated circuits and may include a servo control microprocessor and a disk control microprocessor. Alternatively, the disk controller 24 may comprise a single microprocessor for performing disk, servo, and host interface operations.

The disk drive 2 of FIG. 1 further comprises a voice coil motor (VCM) driver 36 responsive to the primary and secondary supply voltages 12 and 14. The VCM driver 36 applies the primary supply voltage 12 to the voice coil motor 8 through driver 37 either in a linear power amplifier mode or in a modulated sequence (e.g., PWM) to control the speed of the voice coil motor 8 while actuating the head 6 radially over the disk 4. The secondary supply voltage 14 powers circuitry within the VCM driver 36 as well as other circuitry within the disk drive 2, such as the spindle driver 20 and disk controller 24. In one embodiment, the primary supply voltage 12 comprises twelve volts and the secondary supply voltage 14 comprises five volts.

In one embodiment when the voice coil motor 8 is accelerating the head 6 during a seek operation the spindle motor 16 draws more current from the secondary supply voltage 14. In this manner the current limitations on the primary supply voltage 12 imposed by the host computer are not exceeded while maintaining the desired spindle speed and seek performance. Any suitable method for controlling the amount of current drawn from the primary and secondary supply voltages 12 and 14 may be employed, several examples of which are provided below.

Figure 2A:
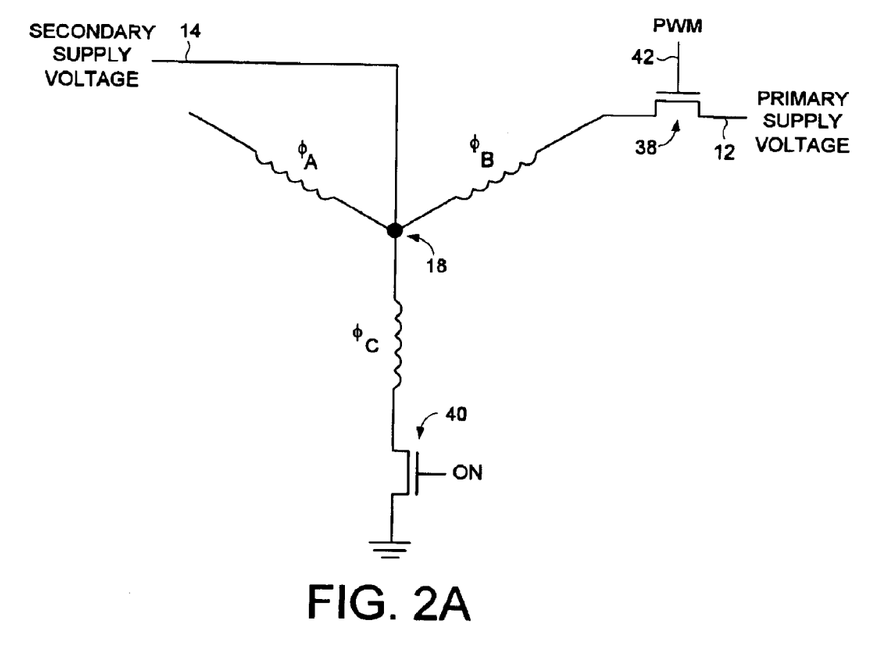
FIG. 2A shows a spindle motor configuration according to an embodiment of the present invention wherein the windings are wound to control the amount of current passing through the windings from the secondary supply voltage.

Referring to FIG. 2A, in one embodiment the windings (ϕA, ϕB, ϕC) in the spindle motor 16 are wound to control the amount of current passing through the windings from the secondary supply voltage 14. FIG. 2A shows a state in the commutation sequence wherein the first end of winding ϕB is connected to the primary supply voltage 12 through switch 38 and the first end of winding ϕC is connected to ground through switch 40. Switch 38 is pulse width modulated by PWM signal 42 in order to control the amount of current drawn from the primary supply voltage 12. When switch 38 is on, the commutation sequence is controlled relative to the back EMF voltage in the windings such that the voltage drop across each winding ϕB and ϕC is half the primary supply voltage 12 (the windings ϕB and ϕC are connected in series during the commutation interval shown). The secondary supply voltage 14 is connected directly to the center tap 18. If the secondary supply voltage 14 is close to one-half the primary supply voltage 12, no current will be drawn from the secondary supply voltage 14 while switch 38 is turned on. When switch 38 is turned off, current is driven through the winding ϕC from the secondary supply voltage 14. The windings (ϕA, ϕB, ϕC) are wound to select the desired resistance for the windings (ϕA, ϕB, ϕC) and thereby the desired amount of current drawn from the secondary supply voltage 14 (as described below with reference to FIG. 2E). In one embodiment, a switch or diode (not shown) disconnects the secondary supply voltage 14 from the center tap 18 when the disk 4 is spun down.

Figure 2B:
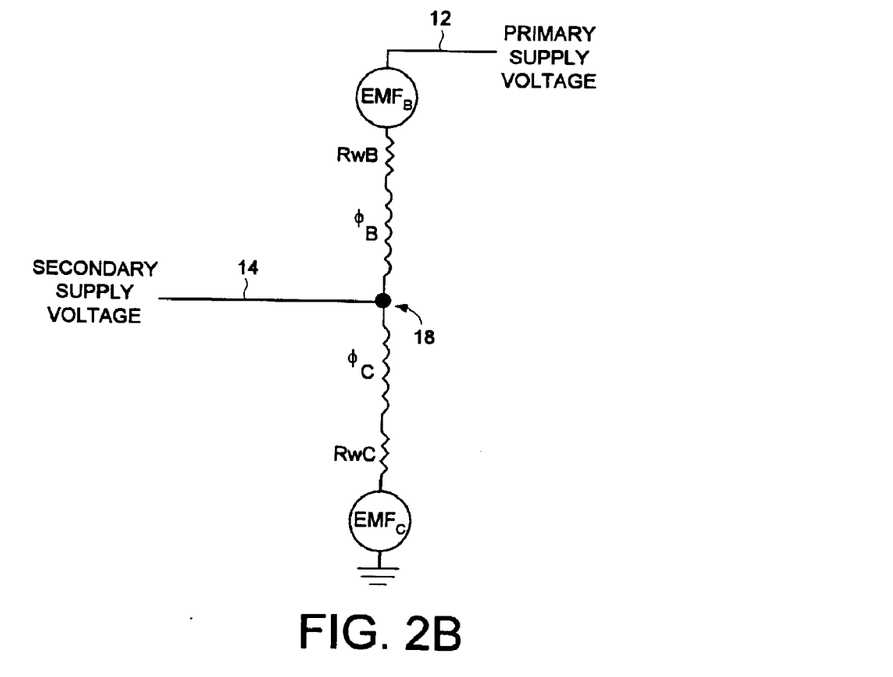
FIG. 2B shows an equivalent circuit for FIG. 2A including the resistance of each winding RwB and RwC as well as the back EMF voltages across each winding.

In one embodiment, a switch or diode (not shown) is employed in FIG. 2A to prevent current flowing from the primary supply voltage 12 to the secondary supply voltage 14 while switch 38 is turned on. In another embodiment, current is allowed to flow from the primary, supply voltage 12 to the secondary supply voltage 14 thereby implementing a power converter (e.g., autotransformer, buck converter, fly-back converter, etc.) for applications where the secondary supply voltage 14 may benefit from a boost in power. This embodiment is understood with reference to FIG. 2B which shows an equivalent circuit for FIG. 2A including the resistance of each winding RwB and RwC as well as the back EMF voltages ($EMF_B$ and $EMF_C$) across each winding. Defining a winding factor Wf proportional to the number of turns of copper wire in each of the windings leads to the following relationships for a fixed cross-section coil in the slots of the motor:

$Rw = Rw_0 * Wf^2$ (phase to phase terminal resistance)

$Kt = Kt_0 * Wf$ (motor torque constant)

$Ke = Ke_0 * Wf$ (motor back EMF voltage constant)

where $Rw_0$, $Kt_0$, and $Ke_0$ represent an initial design point. Using these relationships, a standard motor can be rewound for a large range of PWM duty cycles to supply a given torque. Though the peak current drawn from the power supply in order to generate the given torque is always proportional to the current in the motor windings, the average power drawn from the power supply over any given duty cycle is always constant regardless of how the motor is wound.

Figure 2C:
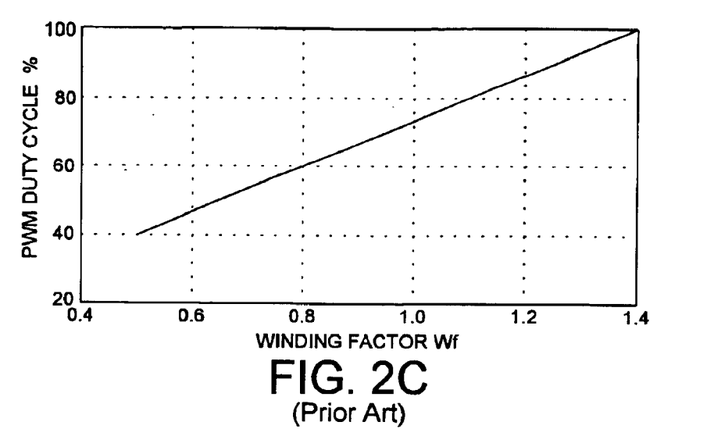
FIG. 2C shows a conventional relationship between the duty cycle of a PWM signal modulating the primary supply voltage and a winding factor Wf of the spindle motor windings.
Figure 2D:
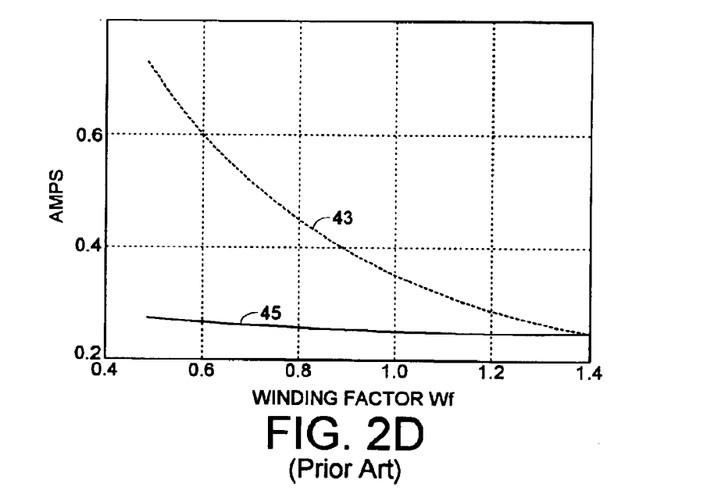
FIG. 2D shows a conventional relationship of the peak current in the spindle motor windings and the average current drawn from the primary supply voltage relative to the winding factor Wf.

Disconnecting the secondary supply voltage 14 from the center tap results in a conventional configuration with the relationship between the duty cycle of PWM signal 42 and the winding factor Wf shown in FIG. 2C. As illustrated, to produce a given torque the duty cycle of PWM signal 42 must increase as the winding factor Wf increases in order to increase the average voltage applied to the windings. FIG. 2D shows the relationship of the peak current 43 in the spindle motor windings and the average current 45 drawn from the primary supply voltage 12 relative to the winding factor Wf As illustrated, for a given torque the peak current 43 in the motor windings decreases as Wf increases whereas the average current 45 drawn from the primary supply voltage 12 remains relatively constant.

With the secondary supply voltage 14 connected to the center tap as shown in FIG. 2B, the possibility exists of exchanging current between the primary and secondary supply voltages through the center tap 18. The resulting circuit can be considered as two separate inductors, one pulling current from the secondary supply voltage 14 and the other dumping current from the primary supply voltage 12 back into the secondary supply voltage 14. Since the current in the winding φB connected to the primary supply voltage 12 is controlled by PWM signal 42, we can add or subtract current through this winding to control speed, even though a constant current is being drawn from the secondary supply voltage 14. The average current operating point is set by the resistance of the windings and the average back EMF voltage, which in turn are established by the winding factor Wf according to the above relationships.

Winding the spindle motor with fewer turns reduces the resistance in each winding as well as the run speed back EMF voltage, thereby increasing the peak current drawn from the secondary supply voltage 14. Conversely, winding the spindle motor with more turns increases the resistance in each winding as well as the run speed back EMF voltage, thereby decreasing the peak current draw from the secondary supply voltage 14. The torque generated by the spindle motor also affects the amount of current drawn from the supply voltages. The torque applied to the load is adjusted by adjusting the duty cycle of PWM signal 42 in a manner similar to the conventional control technique (current is sourced from the primary supply voltage 12 and from the secondary supply voltage 14).

Figure 2E:
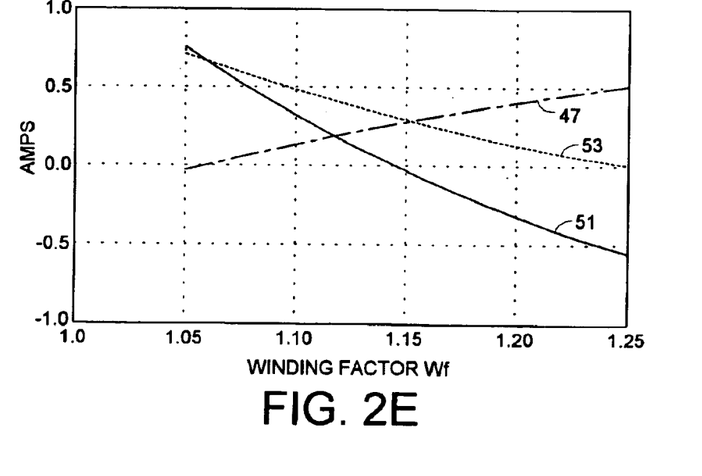
FIG. 2E shows the relationship between the current drawn from the primary and secondary supply voltages (as well as the corresponding currents in the windings) and the winding factor Wf for a typical load torque when the secondary supply voltage is connected to the center tap of the spindle motor.

FIG. 2E shows the relationship between the average current 47 drawn from the primary supply voltage 12 and the winding factor Wf when using a high duty cycle for a typical load torque. FIG. 2E also shows the relationship between the average current 51 drawn from the secondary supply voltage 14 (as well as the related average current 53 in the winding φC) and the winding factor Wf when using a high duty cycle for a typical load torque. For example, at a winding factor Wf of 1.05, the secondary supply voltage 14 provides 0.75 amps of run current, while the primary supply voltage 12 provides essentially no current. Under these circumstances, all the current from the primary supply voltage 12 is available for the VCM 8, allowing for faster seeks without violating the primary supply voltage 12 peak current envelope.

If the winding factor Wf is raised to 1.15, the secondary supply voltage 14 provides essentially no current, while the primary supply voltage 12 provides nearly 0.3 amps. At this point, the 0.3 amps in winding φB produces the proper voltage at the center tap 18 to match the secondary supply voltage 14 (when the secondary supply voltage is 5V). The 0.3 amps passes through winding φC to ground, and the secondary supply voltage 14 contributes net zero current. This arrangement is equivalent to a conventional configuration wherein the spindle motor is driven only by the primary supply voltage 12.

If the winding factor Wf is raised to 1.25, the current in winding φC still matches the current in winding φB because the back EMF is about equal to secondary supply voltage 14. However, the primary supply voltage 12 now provides all the current to drive the spindle motor, and an additional 0.5 amps is dumped from the primary supply voltage 12 and returned to the secondary supply voltage 14. In an embodiment described below with reference to FIG. 6, the secondary supply voltage 14 is eliminated to reduce cost, and current is drawn from the center tap 18 (through the primary supply voltage 12) to power the circuitry in the disk drive.

Figure 2F:
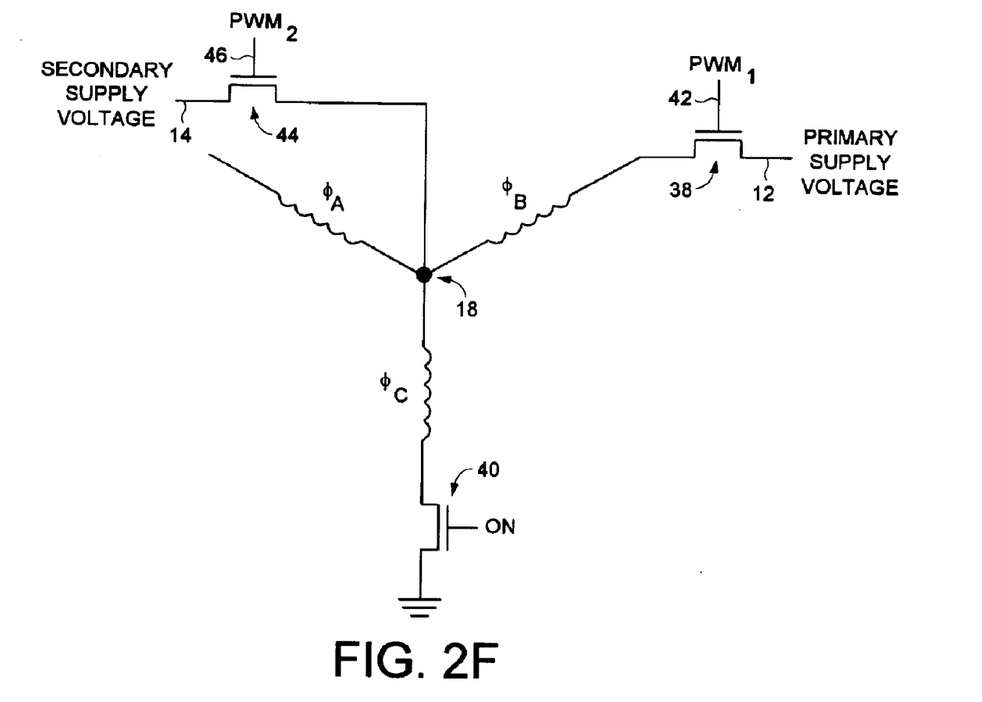
FIG. 2F shows a spindle motor configuration according to an embodiment of the present invention comprising a switch for connecting the secondary supply voltage to the center tap, wherein the switch is modulated to control the amount of current passing through the windings from the secondary supply voltage.

In another embodiment shown in FIG. 2F, the secondary supply voltage 14 is connected to the center tap 18 through a switch 44 pulse width modulated by PWM signal 46 in order to control the amount of current drawn from the secondary supply voltage 14. In the embodiment shown in FIG. 2F the PWM signals 42 and 46 are controlled independently so that switch 44 is turned on for at least part of the time that switch 38 is turned off so that current is drawn from the secondary supply voltage 14. In another embodiment the secondary supply voltage 14 is greater than one-half the primary supply voltage 12 so that the PWM signals 42 and 44 can be controlled dependently (and may be the same signal).

Figure 3A:
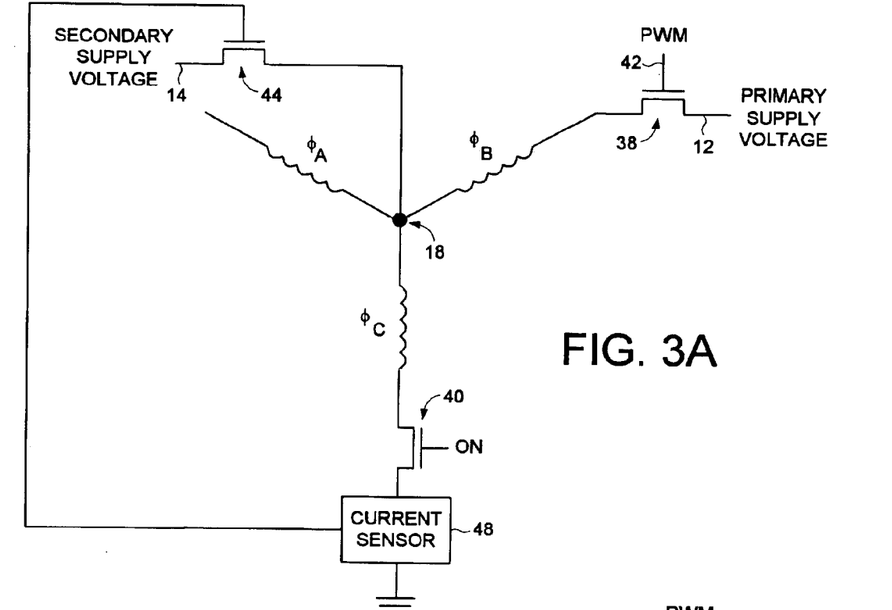
FIG. 3A shows a spindle motor configuration according to an embodiment of the present invention comprising a current sensor for sensing a magnitude of the current passing through the windings, wherein the secondary supply voltage is disconnected from the center tap if the magnitude of the sensed current is greater than a threshold.
Figure 3B:
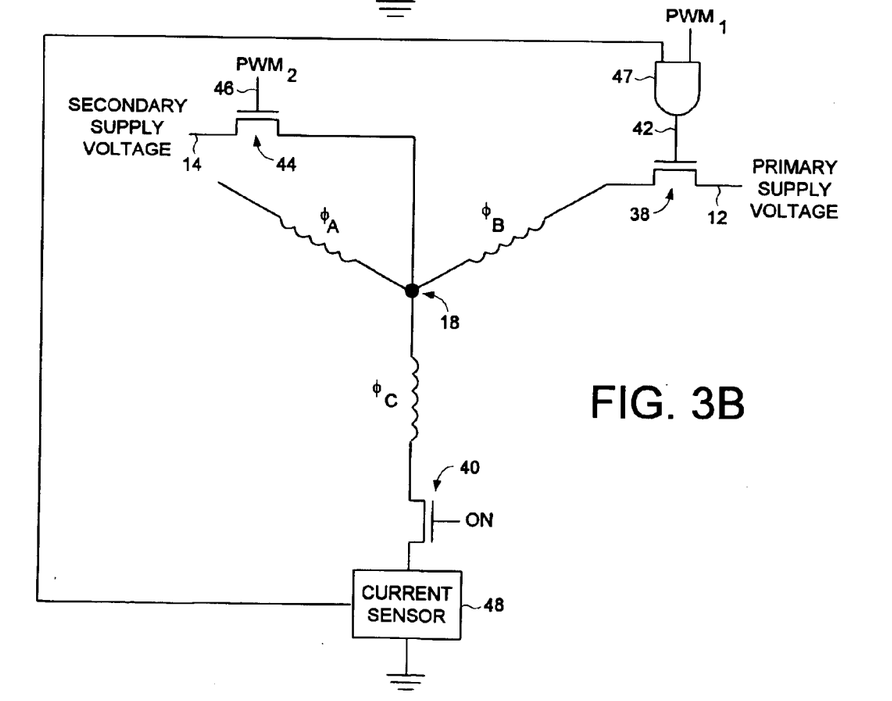
FIG. 3B shows a spindle motor configuration according to an embodiment of the present invention comprising a current sensor for sensing a magnitude of the current passing through the windings, wherein the primary supply voltage is disconnected from the windings if the magnitude of the sensed current is greater than a threshold.

In one embodiment circuitry is provided to limit the amount of current drawn from one or both of the primary and secondary supply voltages. FIG. 3A shows an embodiment of the present invention which limits the amount of current drawn from the secondary supply voltage 14 while still augmenting the primary supply voltage 12. A current sensor 48 senses a magnitude of the current passing through the lower winding φC, and the secondary supply voltage 14 is disconnected from the center tap 18 by switch 44 if the magnitude of the sensed current is greater than a threshold. When the sensed current falls below the threshold, the secondary supply voltage 14 is reconnected to the center tap 18. In one embodiment, the switch 44 is also modulated by a PWM signal 46 as in FIG. 2F wherein the PWM signal 46 is disabled if the sensed current is greater than the threshold. In this embodiment the switch 44 would not be closed again until the cycle of the PWM signal 46 restarts. In another embodiment shown in FIG. 3B the amount of current drawn from the primary supply voltage 12 is limited. The PWM signal 42 modulating the primary supply voltage 12 is disabled through AND gate 47 to disconnect the primary supply voltage 12 from the top winding φB while the sensed current in the lower winding φC is greater than a threshold. In yet another embodiment, the current sensor 48 is used to current limit both the primary and secondary supply voltages by combining the embodiments of FIG. 3A and FIG. 3B. If both switches 38 and 44 are driven by the same PWM signal, it would fix the ratio of current drawn from the primary and secondary supply voltages while reducing the maximum current drawn from both supply voltages. Suitable circuitry for implementing the current sensor 48 is disclosed in the above-referenced patent application entitled "DISK DRIVE COMPRISING SPIN DOWN CIRCUITRY HAVING A POWER CLAMP CIRCUIT FOR ENHANCING POWER AND BRAKING CONTROL".

Figure 4A:
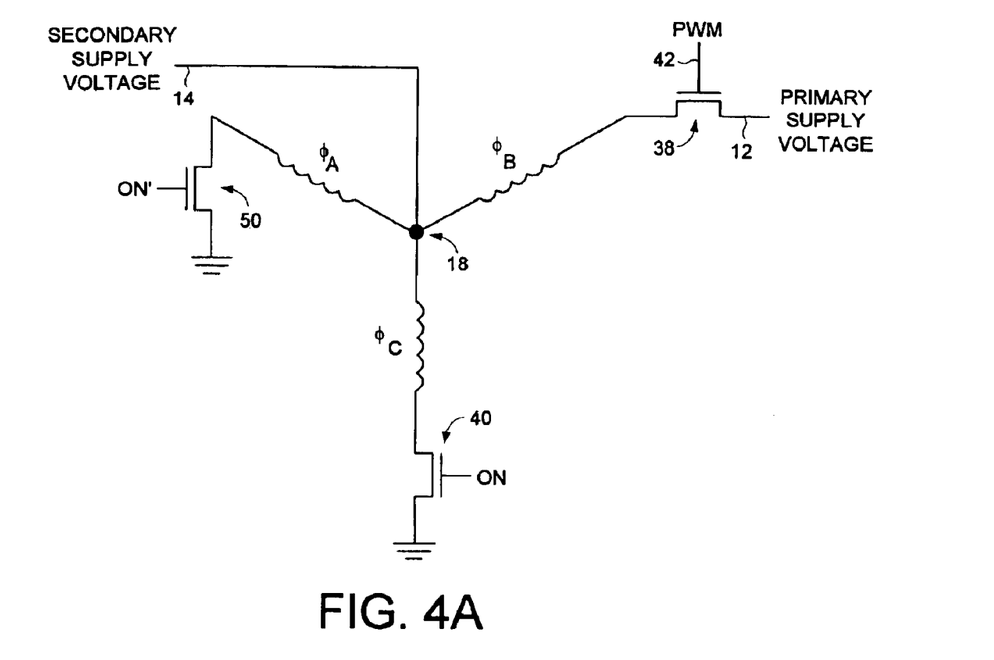
FIG. 4A shows a spindle motor configuration according to an embodiment of the present invention wherein two of the windings are grounded during part of a commutation interval to control the amount of current passing through the windings from the secondary supply voltage.
Figure 5A:
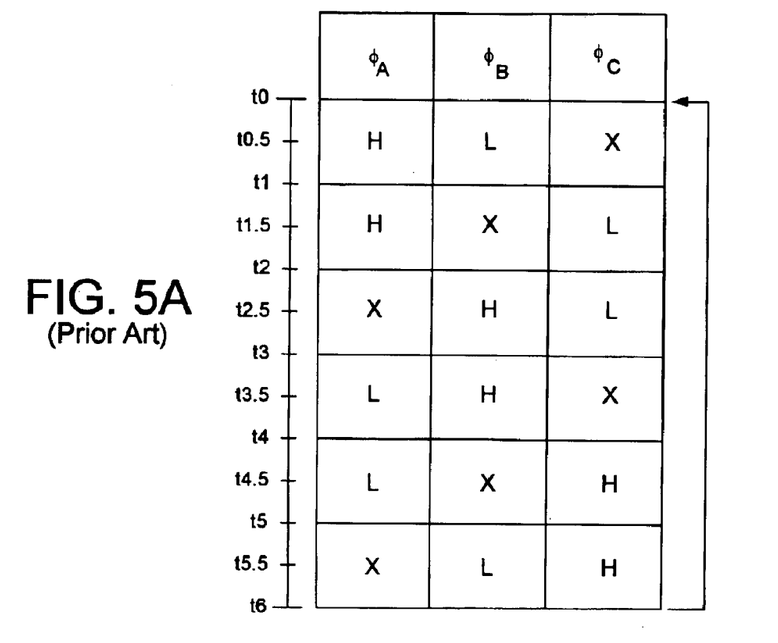
FIG. 5A shows a prior art commutation sequence wherein two phases of a three phase spindle motor are driven during each commutation interval.
Figure 5B:
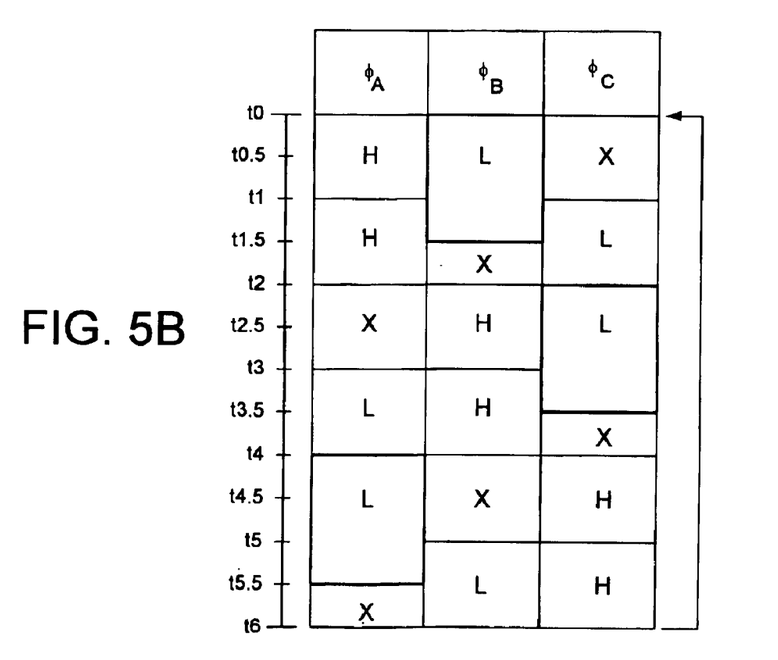
FIG. 5B shows a commutation sequence according to an embodiment of the present invention wherein the "ON" period of the low side driver is extended so that two of the windings are grounded during at least part of a commutation interval to control the amount of current passing through the windings from the secondary supply voltage.

FIG. 4A shows a commutation interval for the spindle motor according to an embodiment of the present invention wherein the third winding φA is grounded during part of the commutation interval to control the amount of current passing through winding φC from the secondary supply voltage 14. While the third winding φA is grounded it is in parallel with the second winding φC which reduces the resistance by half relative to the secondary supply voltage 14 so that current flows from the secondary supply voltage 14 even if the secondary supply voltage 14 is less than half of the primary supply voltage 12. FIG. 5A shows a conventional bipolar commutation sequence wherein during each commutation interval a first winding is connected to the primary supply voltage 12 (designated H), a second winding is grounded (designated L), and the third winding is floating (designated X). At the end of each commutation interval the connections are switched as shown in FIG. 5A, and after six commutation intervals the commutation sequence is repeated. FIG. 5B shows an embodiment of the present invention wherein the conventional commutation sequence of FIG. 5A has been modified so that the winding that was grounded during a previous commutation interval remains grounded for part of the next commutation interval, thereby grounding two of the windings for at least part of the next commutation interval.

Figure 4B:
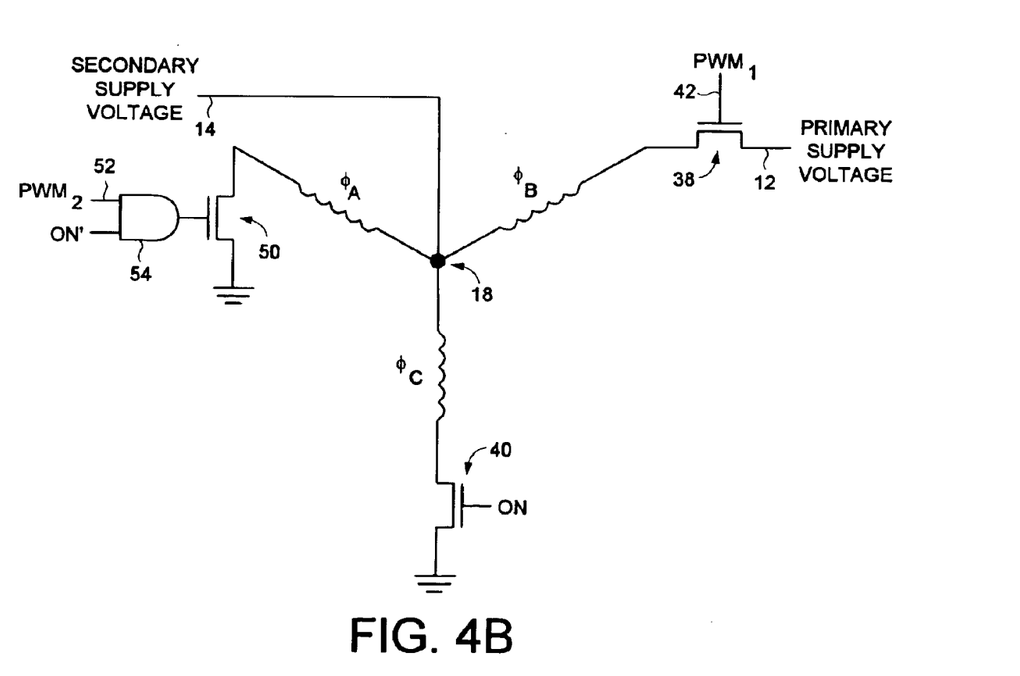
FIG. 4B shows a spindle motor configuration according to an embodiment of the present invention wherein one of the two windings is grounded by a modulation signal to control the amount of current passing through the windings from the secondary supply voltage.

In one embodiment, the part of the commutation interval wherein the two windings are grounded varies in order to control the amount of current drawn from the secondary supply voltage 14. Referring again to FIG. 4A, during the commutation interval shown the commutation logic 22 (FIG. 1) controls the time that switch 50 remains on while holding switch 40 on for the entire commutation interval. During the commutation sequence two of the windings may be grounded for varying time periods (e.g., from zero to a full commutation interval). In another embodiment shown in FIG. 5B, during the commutation sequence two of the windings are grounded for a constant fraction of a commutation interval (e.g., ½ a commutation interval) and the amount of current drawn from the secondary supply voltage 14 is controlled by modulating switch 50 with a PWM signal 52 through AND gate 54 as shown in FIG. 4B. The ratio of current drawn from the primary supply voltage 12 and the current drawn from the secondary supply voltage 14 depends on the ratio of supply voltages, the duty cycle of the third phase switch 50, the duty cycle of the center tap switch if one is present, the winding factor Wf of the motor, and the presence, magnitude and phase of back EMF voltages in the spindle motor 16. These variables are related well enough that a dependable improvement in peak current can be achieved for a given operating condition.

Supplementing the drive current for the, spindle motor 16 by connecting a secondary supply voltage 14 to the center tap 18 increases the torque without requiring a more expensive spindle motor and without exceeding the current limitations of the primary supply voltage 12. The increase in torque facilitates faster spin up times, larger media formats with more inertia, and/or a less expensive spindle motor 16. In addition, supplementing the spindle motor 16 with current from a secondary supply voltage 14 during a seek operation allows the voice coil motor 8 to draw correspondingly more of the available peak current from the primary supply voltage 12 to facilitate faster seeks. As the voice coil motor 8 draws more current from the primary supply voltage 12 (e.g., during the acceleration or deceleration intervals of a seek), the spindle motor 16 draws more current from the secondary supply voltage 14. For example, in FIG. 2F the duty cycle of the PWM signal 46 is increased and the duty cycle of PWM signal 42 is decreased during seeks so that more current is drawn from the secondary supply voltage 14 and less current is drawn from the primary supply voltage 12.

Figure 6:
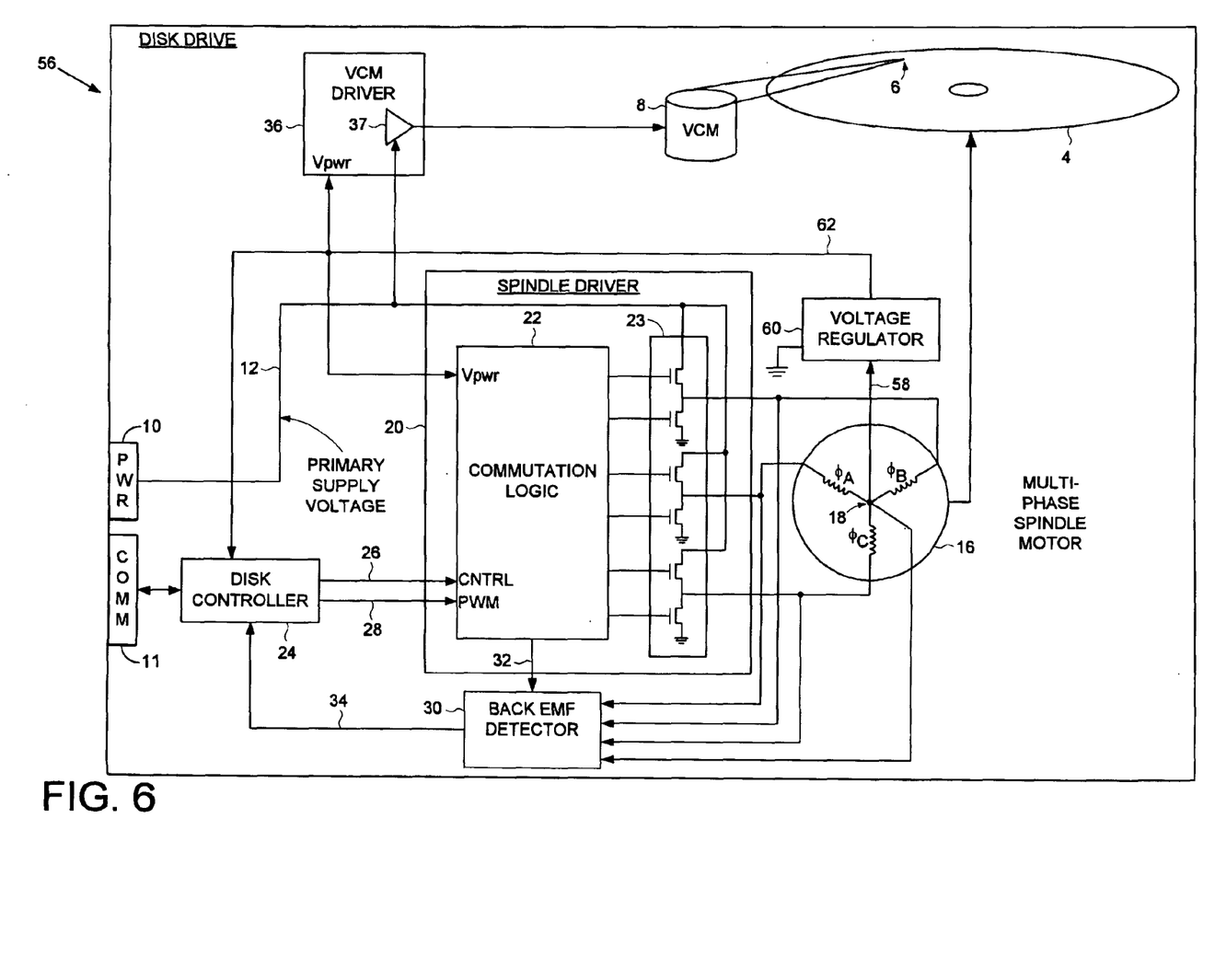
FIG. 6 shows a disk drive according to an embodiment of the present invention wherein the secondary supply voltage in the disk drive of FIG. 1 is eliminated to reduce cost, and the center tap voltage of the spindle motor is used to power control circuitry in the disk drive.

FIG. 6 shows a disk drive 56 according to an embodiment of the present invention wherein the secondary supply voltage 14 in the disk drive of FIG. 1 is eliminated to reduce cost, and the voltage 58 from the center tap 18 is used to power circuitry in the disk drive 56. As described above with reference to FIG. 2E, the windings of the spindle motor 16 are wound so that current is sourced from the primary supply voltage 12 through the center tap 18. A voltage regulator 60 regulates the center tap voltage 58 to generate a regulated supply voltage 62 used to power circuitry in the disk drive 56 (e.g., the disk controller 24, VCM driver 36, spindle driver 20, etc.). Further details of this embodiment are disclosed in the above-referenced patent application entitled "DISK DRIVE COMPRISING CONTROL CIRCUITRY POWERED BY A CENTER TAP VOLTAGE OF A SPINDLE MOTOR DURING A NORMAL OPERATING MODE".

We claim:

1. A disk drive comprising:
   (a) a disk comprising a plurality of tracks;
   (b) a head;
   (c) a voice coil motor for actuating the head radially over the disk;
   (d) an interface for receiving a primary supply voltage and a secondary supply voltage from a host computer;
   (e) a multi-phase spindle motor for rotating the disk, the multi-phase spindle motor comprising a plurality of windings, each winding comprising a first end and a second end, the second ends connected together at a center tap; and
   (f) a spindle driver, responsive to the primary supply voltage, for sourcing a drive current in the windings over commutation intervals,
   wherein the center tap is connectable to the secondary supply voltage to supplement the drive current in the windings.

2. The disk drive as recited in claim 1, wherein the primary supply voltage comprises twelve volts and the secondary supply voltage comprises five volts.

3. The disk drive as recited in claim 1, wherein the secondary supply voltage powers circuitry within the spindle driver.

4. The disk drive as recited in claim 1, wherein the windings are wound to control the amount of current passing through the windings from the secondary supply voltage.

5. The disk drive as recited in claim 1, wherein the center tap is connected directly to the secondary supply voltage.

6. The disk drive as recited in claim 1, further comprising a switch for connecting the secondary supply voltage to the center tap, wherein the switch is modulated to control the amount of current passing through the windings from the secondary supply voltage.

7. The disk drive as recited in claim 1, further comprising a current sensor for sensing a magnitude of the current passing through the windings, wherein the secondary supply voltage is disconnected from the center tap if the magnitude of the sensed current is greater than a threshold.

8. The disk drive as recited in claim 1, wherein the spindle driver connects the first end of a first one of the windings and the first end of a second one of the windings to ground for at least part of a commutation interval in order to control the amount of current passing through the windings from the secondary supply voltage.

9. The disk drive as recited in claim 8, wherein the interval that the first end of the second one of the windings is connected to ground varies in order to control the amount of current passing through the windings from the secondary supply voltage.

10. The disk drive as recited in claim 8, wherein the spindle driver is responsive to a modulation signal for modulating the connection of the first end of the second one of the windings to ground for at least part of the commutation interval in order to control the amount of current passing through the windings from the secondary supply voltage.

11. The disk drive as recited in claim 1, wherein when the voice coil motor is accelerating the head during a seek operation the spindle motor draws less current from the primary supply voltage and more current from the secondary supply voltage.

12. The disk drive as recited in claim 11, wherein the voice coil draws more current from the primary supply voltage to facilitate faster seeks.

13. The disk drive as recited in claim 1, wherein the secondary supply voltage draws current from the primary supply voltage through the center tap of the windings to implement a power converter.

14. A method of operating a disk drive, the disk drive comprising a disk having a plurality of tracks, a head, a voice coil motor for actuating the head radially over the disk, an interface for receiving a primary supply voltage and a secondary supply voltage from a host computer, and a multi-phase spindle motor for rotating the disk, the multi-phase spindle motor comprising a plurality of windings, each winding comprising a first end and a second end, the second ends connected together at a center tap, the method comprising the steps of:

(a) sourcing a drive current in the windings over commutation intervals in response to the primary supply voltage; and (b) connecting the secondary supply voltage to the center tap of the windings to supplement the drive current in the windings.

15. The method as recited in claim 14, wherein the primary supply voltage comprises twelve volts and the secondary supply voltage comprises five volts.

16. The method as recited in claim 14, wherein the secondary supply voltage powers circuitry within the disk drive.

17. The method as recited in claim 14, wherein the windings are wound to control the amount of current passing through the windings from the secondary supply voltage.

18. The method as recited in claim 14, wherein the center tap is connected directly to the secondary supply voltage.

19. The method as recited in claim 14, wherein a switch connects the secondary supply voltage to the center tap, further comprising the step of modulating the switch to control the amount of current passing through the windings from the secondary supply voltage.

20. The method as recited in claim 14, further comprising the steps of:

(a) sensing a magnitude of the current passing through the windings; and (b) disconnecting the secondary supply voltage from the center tap if the magnitude of the sensed current is greater than a threshold.

21. The method as recited in claim 14, further comprising the step of connecting the first end of a first one of the windings and the first end of a second one of the windings to ground for at least part of a commutation interval in order to control the amount of current passing through the windings from the secondary supply voltage.

22. The method as recited in claim 21, further comprising the step of varying the interval that the first end of the second one of the windings is connected to ground in order to control the amount of current passing through the windings from the secondary supply voltage.

23. The method as recited in claim 21, further comprising the step of modulating the connection of the first end of the second one of the windings to ground for at least part of the commutation interval in order to control the amount of current passing through the windings from the secondary supply voltage.

24. The method as recited in claim 14, wherein when the head is accelerating during a seek operation the spindle motor draws less current from the primary supply voltage and more current from the secondary supply voltage.

25. The method as recited in claim 24, wherein the voice coil motor draws more current from the primary supply voltage to facilitate faster seeks.

26. The method as recited in claim 14, wherein the secondary supply voltage draws current from the primary supply voltage through the center tap of the windings to implement a power converter.

* * * * *